Dec. 13, 1966     R. L. STUEFEN     3,292,038
D.C. POWER SUPPLY
Filed June 3, 1964

INVENTOR.
ROBERT L. STUEFEN
BY
Andrus & Starke
Attorneys

United States Patent Office 3,292,038
Patented Dec. 13, 1966

3,292,038
D.C. POWER SUPPLY
Robert L. Stuefen, Fontana, Wis., assignor, by mesne assignments, to Harnischfeger Corporation, Milwaukee, Wis., a corporation of Wisconsin
Filed June 3, 1964, Ser. No. 372,190
12 Claims. (Cl. 315—142)

This invention relates to a direct current (D.C.) arc power supply and particularly to such a power supply having a high open circuit voltage for initially establishing the arc or the like and a substantially smaller load voltage for maintaining the arc or the like.

The present power supply is particularly directed to a transformer power supply connected to three phase incoming power lines to reduce the line voltage to a voltage suitable for establishing and maintaining the arc between arc electrodes, an electrolytic current between suitable electrodes or the like. The circuit is particularly applicable to consumable arc melting furnaces, plasma generators, torches, similar high current arc melting process and electrolytic current process wherein the power source should provide relatively high open circuit voltage which drops more or less linearly with the increase in load current; i.e. a drooping volt-amp characteristic. The higher open circuit voltage is particularly necessary to provide a restriking voltage in vacuum and pressurized steel melting processes.

Dual open circuit systems have also been employed wherein a pair of secondaries are provided. One of the secondaries is a low voltage, high amperage supply to maintain the arc while the other is a high voltage, low amperage unit interconnected in parallel to establish the arc. For example, the load maintaining secondary may be rated at 55 volts open circuit and 40 volts full load voltage. This unit is the maintaining power supply and generally is rated at the load current of 15,000 amperes. In parallel with this unit is the tickler or arc striking secondary which provides 80 volts open circuit and 40 volts full load at 2500 amps. The combination of the two units provides a desired 17,500 ampere unit at 40 volt full load. This provides a lower overall KVA but does require two separate power supplies. The high current, low voltage unit generally includes a three phase transformer having double wye connected secondaries and an interphase transformer connects the common points whereas the tickler, which has the higher no load voltage but lower current rating, is a conventional three phase bridge circuit. The main transformer functions as a one-half wave, six phase system with the respective phases conducting for 60° of each cycle.

The present invention is particularly directed to a single transformer rectifier power supply unit providing the necessary high open circuit voltage for striking of an arc and rapidly dropping to a relatively constant potential having a relatively straight volt-amp characteristic. The present invention is based on the realization that proper control and design of the interphase transformer of a multiphase unit can adjust the mode of operation of the system to directly provide the desired voltage versus amperage characteristic. The circuit in accordance with this invention is designed such that the interphase transformer is ineffective during the initial loading period and as a result the output is a multiple phased half wave output with a high open circuit voltage which drops rapidly with the load current. At a selected load current, the current through the windings of the interphase transformers causes a saturation effect and an interphase interaction which modifies the power supply characteristic such that the output characteristic more closely simulates that of constant potential characteristic having only a very slight voltage drop with substantial increases in load current. In this second mode, the transformer functions as a triple diametric six phase supply with conduction over practically 180°. The interphase transformers do not require substantial or expensive windings and consequently are inexpensive components. The circuit of this invention thus provides the high open circuit voltage supply in a unit of substantially less KVA rating and consequently substantially reduces the power supply cost, size, weight and the like as well as a substantially improved and higher power factor.

As a result, the present invention provides a very simple and ready means of obtaining the necessary characteristic for plasma arc, arc melting and other similar arc welding power supplies. In essence, the present invention eliminates the need for the large power supplies which include the high reactive KVA for providing the dropping voltage after initial arc striking.

In accordance with a preferred construction of the present invention, a three phase transformer is provided having a three phase primary connected to suitable incoming three phase power lines. Three separate secondaries are provided each of which is similarly connected in circuit. A pair of diodes is connected with opposite polarities across the winding with the junction between the diodes providing a direct current output lead. The winding is center tapped and interconnected through an interphase transformer to provide the second or opposite D.C. output lead from the power supply. The interphase transformers are made adjustable in order to permit setting of the operating point and balancing of the three interphase transformers to provide the desired action. For example, each of the interphase transformers may include separate windings, one connected directly in series with the center tapped associated winding and the opposite connected in series with a center tapped connecting winding of a different phase. The windings are magnetically coupled together with the degree of magnetic coupling made adjustable in any suitable manner. For example, a magnetic coupling core having a variable air gap therein may be employed. Alternatively, the core can be closed or have a fixed air gap with a saturating winding to adjust the magnetization level and thereby the coupling of the interphase windings.

The above power sources produce a very high open circuit voltage during the initial loading which rapidly drops with increasing load current; i.e. the characteristic has an exceptionally steep slope. During this initial load current portion, the interphase transformers are magnetized only slightly, and the circuit operates in a first initial mode. The output then corresponds to that of a six phase, half wave rectifier circuit and provides a high open circuit voltage. As the current increases, the magnetization of the interphase transformers increases and during the initial mode the voltage drops rather sharply, depending on the magnetic adjustment of the interphase transformers, until the magnetization becomes sufficient such that they noticeably effect the output characteristic of the machine and in fact so interact as to convert the mode of operation from a six phase, half wave rectification to a triple diametric six phase rectifier system. The switchover or change point is controlled by the coupling of the interphase transformers and thus provides a very simple means for converting from six phase star to six phase operation with a resulting conversion from a high voltage, low amperage source to a relatively low voltage, high amperage source.

The present invention thus provides a single transformer rectifier circuit having a controllable output direct current power supply characteristic particularly satisfactory for high current arcs such as encountered in arc melting plasma arcs and the like.

The many advantages and simplicities resulting from the present invention will be clearly understood by those skilled in the art as a result of the following description of the drawing submitted herewith illustrates constructions of the present invention.

Figure 1:
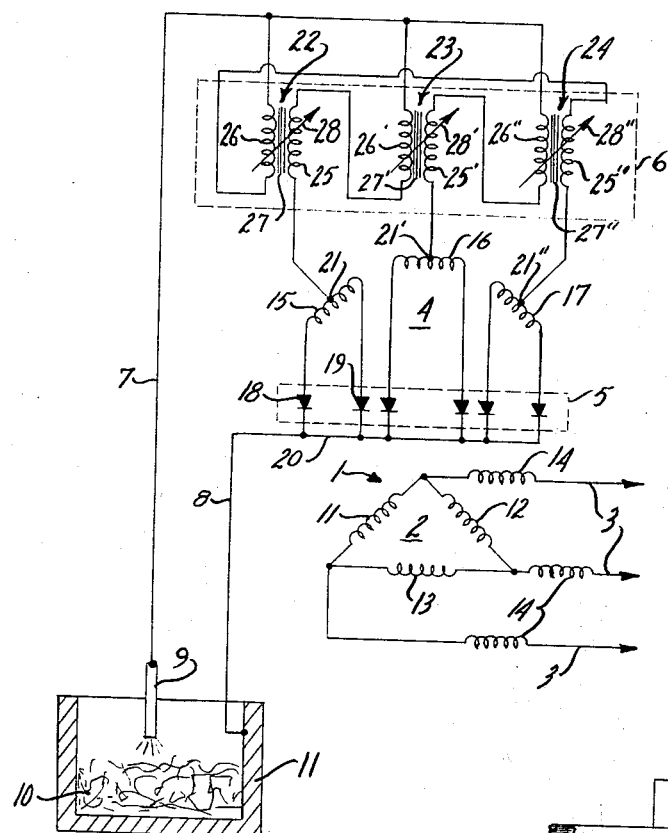
FIG. 1 is a schematic circuit diagram of an arc power supply and an arc interconnected in accordance with the present invention.

Referring to the drawing and particularly to FIG. 1, an arc melting power supply system is illustrated generally including a three phase power transformer 1 having a three phase primary 2 connected to suitable alternating current (A.C.) incoming power lines 3 such as the conventional 110 volt power distribution employed in the United States. A secondary 4 is magnetically coupled to the primary 2 to provide power through a bank of rectifiers 5 and an interphase transformer assembly 6 to a pair of arc leads 7 and 8. Rectifiers 5 convert the alternating current in the secondary 4 to a suitable direct current power for establishing and maintaining of an arc between the end of electrode 9 and metal scrap 10 housed within an arc furnace which forms the other electrode of the system.

Figure 2:
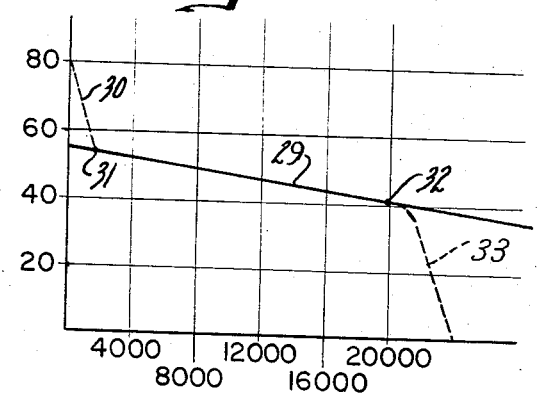
FIG. 2 is an idealized curve of the power supply shown in FIG. 1.

In operation, completion of the power supply circuit creates a high open circuit voltage for initial striking of the arc between the electrode 9 and the metal scrap 10. In the initial mode of operation while an arc is being struck the three phase transformer 1 in combination with the interphase transformer assembly 6 and rectifier bank 5 provides a six phase, half wave rectified direct current power across electrode 9 and metal scrap 10. This produces a relatively high open circuit voltage. During the striking of the arc and as the load current increases, the available power is that under the idealized curve line 30. At the mode change, the magnetization of the interphase transformer assembly 6 provides an interaction with the transformer secondary 4 to convert the output to a triple diametric six phase rectified output having a relatively constant output voltage with increasing load current. Thus, the slope of the load line of the transformer 1 varies from an initial short but very steep portion to a relatively long constant potential portion over the working range of the power supply, as shown in FIG. 2. In accordance with this invention, the mode change point between the steep portion and the relatively flat portion is made adjustable such that sufficient power is available with the high open circuit during starting and initial loading of the circuit. A final terminal portion drops rapidly to limit the short circuit current.

More particularly, in the illustrated embodiment of the invention, the primary 2 includes three phase windings 11, 12 and 13 interconnected in a delta circuit to the incoming three phase lines 3 which include suitable primary reactances 14. The secondary 4 includes similar phase related windings 15, 16 and 17 each similarly coupled to the corresponding windings 11, 12 and 13. For purposes of discussion hereafter, the winding 15 will be denoted as the first phase winding, winding 16 as the second phase and winding 17 as the third phase. Each of the windings is generally similarly connected into the circuit and the first phase winding 15 will be described hereinafter in detail with corresponding connections and elements for windings 16 and 17 similarly numbered with primes and double primes, respectively, to distinguish therebetween.

The output of the winding 15 is converted to a full wave rectified output by a pair of rectifying elements 18 and 19 illustrated by the conventional diode symbol. The rectifiers may be of any suitable half wave variety but are preferably solid state silicon diode presently widely employed in commercial rectifying circuits. The rectifiers 18 and 19 are connected in a conventional full wave rectifying circuit by connecting of the rectifiers across the associated windings 15 with opposite polarities and with the junction therebetween connected to a common positive output lead 20 which in turn is connected to the positive arc lead 8.

A center tap 21 on the secondary winding 15 is interconnected to the opposite or negative D.C. output lead 7 in series with the interphase transformer assembly 6.

The transformer assembly 6 includes three separate interphase transformers 22, 23, and 24, one for each of the secondary windings 15, 16 and 17. Interphase transformer 22 associated directly with winding 15 hereinafter described in detail with corresponding elements of the transformers 23 and 24 similarly numbered with primes and double primes respectively.

The interphase transformer 22 includes a pair of transformer or phase windings 25 and 26 magnetically coupled by a magnetic core shown diagrammatically by the conventional line symbol 27. The coupling is adjustable as diagrammatically shown by the variable coupling arrow 28 passed angularly through the transformer illustration.

The interphase transformer 22 is interconnected in the circuit as follows. The interphase winding 25 has one side connected directly to the center tap 21 and the opposite side connected to winding 26' of interphase transformer 23. The opposite side of the latter winding 26' is connected to the negative output lead 7. The winding 26 of interphase transformer 22 has one side connected directly to the negative lead 7 and the opposite side connected in series with the winding 25" of the interphase transformer 24.

The interphase transformers 23 and 24 are similarly connected in the circuit. Thus, interphase transformer 23 has its winding 25' connected between the center tap 21' of the secondary 16 and the negative lead 7 in series with the winding 26" of interphase transformer 24. Winding 26' of interphase transformer 22 is connected between the negative lead 7 and the winding 25 of the first phase transformer 22, as previously described. Interphase transformer 24 has its winding 25" connected between the associated center tap 21" and negative lead 7 in series with winding 26 of transformer 22 and winding 26", as previously noted, is connected in series with winding 25' of transformer 23.

An idealized curve illustrating the output of the power supply is shown in FIG. 2; with the voltage shown on the vertical axis and the amperage shown on the horizontal axis. The desired operating load line 29 is shown as a solid load line having an open circuit voltage of approximately 53.2 volts and 40 volts at 15,000 amperes. However, it is desired to have an open circuit voltage of 80 volts for initially striking of the arc and to provide sufficient power during the initial loading period to establish and maintain the load current.

In accordance with the present invention, the initial load characteristic follows that of the dotted line 30 extending from zero current and 80 volts open circuit and dropping sharply to approximately a mode change point 31 intersecting with load line 29 at a D.C. voltage of 53 volts and a D.C. amperage of approximately 2,000 amps. During the initial load line 30, the magnetization of the cores 27 is such that they are effectively removed from the circuit and, as is well known, a three phase, center tapped circuit provides a six phase output. However, at the mode change point 31 the interphase transformers 22, 23 and 24 are magnetized by a magnetizing current sufficient to convert from the six phase, half wave current to a triple, six phase, half wave current. The unit will then follow a relative straight load line 29 to section 33 where it will drop rapidly due to the effect of the reactors 14 in the primary circuit.

The circuit with the adjustable interphase transformers and the substantial open circuit voltage, permits adjustment of the mode change point to provide the necessary power for establishing the initial load such as the arc. The KVA rating of the transformer may, however, be based on the load line 29. The transformer circuit operating as a conventional six phase star without the adjustable interphase transformers with the selected open circuit voltage and operating voltages and currents would generally follow a load line beginning at the selected open circuit voltage and dropping as a single straight line to point 32. However, to produce such a unit with sufficient open circuit voltage would generally not be commercially practical.

The mode change point appears to be determined by the bias of the respective diodes 18 and 19 to convert the operation from the conventional six phase, half wave rectifying circuit to the triple diametric, single phase, half wave rectifying circuit. The mode change point 31 of the power supply at which conversion from the six phase, half wave rectified output to the triple diametric, single phase, half wave rectified output is obtained may be changed by changing the coupling of the respective windings 25 and 26 of the interphase transformers 22, 23, 24 and thereby varying the interaction of the interphase transformers. Thus, the coupling of the windings 25 and 26 of the interphase transformers determines the magnetizing current requirements beyond which any further increase in magnetization results in the mode change interaction between the respective phases.

The main three phase transformer is provided with sufficient internal reactance or a separate reactor can be provided, as shown, to create the sharply drooping characteristic line 33 following the desired load position of 15,000 amps at 40 volts.

Thus, it is seen that the output characteristic of this circuit provides the desired high open circuit voltage and the desired operating load line 29 for maintaining of the arc.

Generally, it appears that the mode change is the result of a change in the conduction angle of the power transformer 1 and the rectifier bank 5. In the six phase operation, the diode generally conducts for approximately one-sixth of each cycle or 60°. Although six phase circuits are known, they have been considered of academic interest and have found only extremely limited application because of the large transformer requirements attendant the steep slope together with the very poor regulation. The transformer secondary winding must be rated at approximately 80% and the primary windings 28% greater than that of the rectifiers. They have generally been considered particularly unsatisfactory for power supplies for the above reasons. However, in accordance with the present invention, the six phase construction is only maintained during the initial arc striking and thus the normal disadvantages are not of any particular consequence. When the interphase transformers are magnetized, they provide interaction to bias the respective rectifying elements to act in a single phase manner with each of the diodes conducting for substantially 180°. This constitutes a triple, single phase, half wave rectified output heretofore described as the triple diametric half wave output.

The transition from the normal opearting mode to the final operating mode is made with the primary current maintained proportional to the short circuit currents. The interphase transformers may also function as series saturable reactors to provide a highly responsive and reliable short circuit current limiting reactor.

Figure 3:
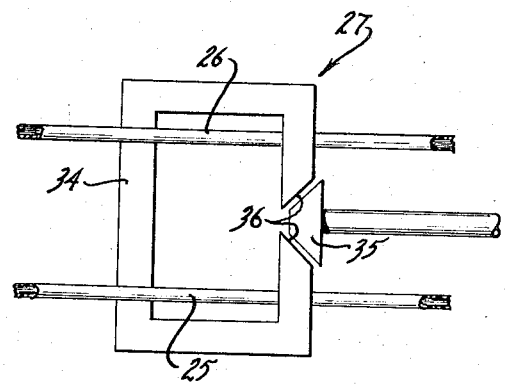
FIG. 3 is a partial schematic circuit diagrammatically illustrating interphase cores having a variable air gap control.

The interphase coupling may be controlled in any desired manner. Thus, cores 27 may include a variable air gap to control the magnetic coupling and therefore the mode change point 31; for example, as shown in the circuit of FIG. 3. Corresponding elements in FIGS. 1 and 3 are correspondingly numbered for simplicity of explanation.

Generally, the core 27 of FIG. 3 includes a rectangular core 34 having an air gap within which a bridging core element 35 is variously positioned. The size of the air gap in the magnetic path through core 34 is determined therefor by the positioning of core 35 and, in turn, controls the coupling of associated windings 25 and 26. In FIG. 3, the respective windings 25 and 26 interconnected between the center taps 21 of the interphase secondary windings 15, 16 and 17 and the negative lead 7 are simple pass-through leads which passes directly through the window formed by cores 34. This provides a very simple and inexpensive construction. Further, it permits a very simple means for adjusting the air gap.

The interphase transformers 22, 23 and 24 are such that a minimum magnetizing current must flow through the transformers from one phase to another to create the mode change point 31 of FIG. 2. In FIG. 3, varying of the air gaps 36 will vary the resulting flux density in the interphase transformer core 34 for a given current.

Further, each of the interphase transformers 22, 23 and 24 should be balanced to provide a similar interaction. This, of course, can be readily done by balancing out of the air gaps in the respective cores 27, 27' and 27''.

The present invention thus provides a single transformer power supply having a relatively high open circuit voltage with a minimum KVA rating. The supply has an inherently higher power factor and efficiency than the power transformer units heretofore employing auxiliary arc striking circuits. Although the interphase transformers may require substantial amounts of iron, they employ minimal amounts of copper windings. Consequently, the cost thereof is relatively low compared to the primary reactors, auto-transformers and the like which are more generally employed in power supplies.

The present invention thus provides an improved arc power source employing a half wave, six phase rectifier connection for producing high open circuit voltage and small values of output current and a triple diametric rectifier connection for a low voltage, high current output.

Various modes of carrying out the invention are contemplated as being within the scope of the following claims particularly pointing out and distinctly claiming the subject matter which is regarded as the invention.

I claim:

1. In a polyphase power supply for supplying a load, a polyphase transformer,
rectifying means interconnected with the polyphase transformer to produce a direct current output, and
control means connected with the transformer and the rectifying means and controlling the operational mode of the supply to produce a polyphase half wave rectified output following a load line having a high open circuit voltage which decreases rapidly with the load current and a multiple phase, half wave rectified output following a second load line characterized by having a substantially smaller open circuit voltage and a substantially constant voltage within the rated load.

2. The power supply of claim 1 having means to change the load line at load current above the rated load to follow a sharply drooping characteristic.

3. The power supply of claim 1 wherein said control means includes an interphase transformer which controls the operational mode of the supply.

4. In an arc power supply,
a transformer having a plurality of electrically angularly displaced windings,
half wave rectifying means interconnecting said windings in a direct current output circuit, and
interphase transformer means interconnected with said windings within said circuit, said interphase transformer means being essentially inoperative during initial loading of the circuit to provide a multiple phase, half wave rectified power to the load having a sharply drooping load line of sufficient power for restriking of an arc and becoming operative at a selected load current to convert the output to a half wave, triple diametric, six phase output having a slowly drooping load line.

5. The arc power supply of claim 4 wherein said interphase transformers include cores having load lines passing therethrough and means are associated with the cores to adjust the magnetizing current thereof.

6. In a direct current power supply,
a three phase transformer having three separate secondary windings,
half wave rectifying means interconnecting said windings in a direct current output circuit,
three interphase transformer means interconnected in the output circuit in series with secondary windings, said interphase transformer means being essentially inoperative during initial loading of the circuit to provide multiple phase, half wave rectified power to the load having a high open circuit voltage and a sharply drooping load line and becoming operative at a selected load current to convert the output to a half wave, triple diametric, six phase output having relatively low open circuit voltage and load line of a substantially different slope, and
means to adjust the magnetizing current of the interphase transformers and thereby the selected load current.

7. In an arc power supply,
a transformer having a plurality of electrically angularly displaced windings,
half wave rectifying means interconnecting said windings in a direct current output circuit,
interphase transformer means having interphase windings interconnected with said windings within said circuit, said interphase transformer means being essentially inoperative during initial loading of the circuit to provide a multiple phase, half wave rectified power to an arc load having a sharply drooping load line and becoming operative at a selected load current to convert the output to a triple diametric, half wave, six phase output having a slowly drooping load line, and
adjustable means to vary the load current level at which said interphase transformer means is effective to change the operational mode of the circuit.

8. In a direct current power source for supplying direct current power to initiate a load between electrode means, and having an output characteristic with a selected open circuit voltage and a selected load voltage, comprising
a pair of output connections,
a three phase transformer having three secondary windings, said secondary windings each being center tapped,
three pairs of half wave rectifying diodes, one pair for each secondary winding and connected one each to the opposite outer ends of each secondary winding with the diodes of each winding being interconnected to form a direct current output terminal, connected to one of said output connections, and
three interphase transformers one for each secondary winding, each having a pair of windings magnetically coupled, one of said windings being connected to the center tap of the corresponding secondary winding and in series with the winding of different interphase transformer to the second output connection and the other of said windings being connected in series with the center tap connected winding of a different interphase transformer to the second output connection, said interphase transformers being selected and constructed to provide a six phase, half wave rectified output during initial loading to provide a high open circuit voltage and creating a triple diametric, half wave, six phase output at full load to reduce the output voltage.

9. The power source of claim 8 including means to vary the coupling of the interphase transformer windings to control the changeover loading point and to balance the three circuits.

10. The power source of claim 8 wherein each of said interphase transformers includes a generally rectangular core member having said windings in the form of pass-through leads from the corresponding secondary windings, and
preset means are associated with the core members to adjust the coupling of the respective interphase transformers.

11. The power source of claim 10 wherein said core member includes an air gap and said preset means includes means to adjust the size of the air gap.

12. In an arc system,
electrode means between which a direct current arc is to be struck and maintained,
a transformer having three primary windings and three separate secondary windings each having center tap,
three pairs of half wave rectifying diodes, one pair for each secondary winding and connected one each to the opposite outer ends of each secondary winding with the diodes of each winding being interconnected to form a direct current output terminal connected to one of said electrode means,
three adjustable interphase transformers one for each secondary winding and each having a pair of interphase windings wound on a separate core, a first of said interphase windings being connected to the center tap of the corresponding secondary winding and in series with the second interphase winding of different one of the interphase transformers to the second electrode means, said interphase transformers being selected and constructed to be ineffective below an initial magnetizing electrode load current, a six phase, half wave rectified output having a high open circuit voltage is supplied to the electrode means during initial loading and becomes rapidly effective to modify the bias on the diodes at selected current range above the initial loading portion such that a triple diametric, half wave, six phase output in which the diodes conduct over substantially 180° with a reduced voltage suppled to the electrode means.

References Cited by the Examiner

UNITED STATES PATENTS

| | | | |
|---|---|---|---|
| 1,650,658 | 11/1927 | Seede | 315—143 X |
| 2,044,798 | 6/1936 | Landis | 315—139 |
| 2,243,572 | 5/1941 | Moyer et al. | 315—140 X |
| 2,734,981 | 2/1956 | Bichsel et al. | 219—131 |
| 2,960,626 | 11/1960 | Mulder | 219—131 X |
| 3,035,205 | 5/1962 | Berghaus et al. | 315—146 X |
| 3,058,047 | 10/1962 | Tajbl | 219—131 X |
| 3,069,614 | 12/1962 | Steinert et al. | 219—131 X |
| 3,102,976 | 9/1963 | Blair | 219—131 X |
| 3,199,016 | 8/1965 | Greene et al. | 219—131 X |

FOREIGN PATENTS

| | | |
|---|---|---|
| 1,096,633 | 2/1955 | France. |

JOHN W. HUCKERT, *Primary Examiner.*

A. J. JAMES, *Assistant Examiner.*